No. 637,656. Patented Nov. 21, 1899.
J. PARKER & J. E. THOMPSON.
DEVICE FOR LOOSENING AND TOPPING BEETS.
(Application filed Mar. 17, 1899.)
(No Model.)
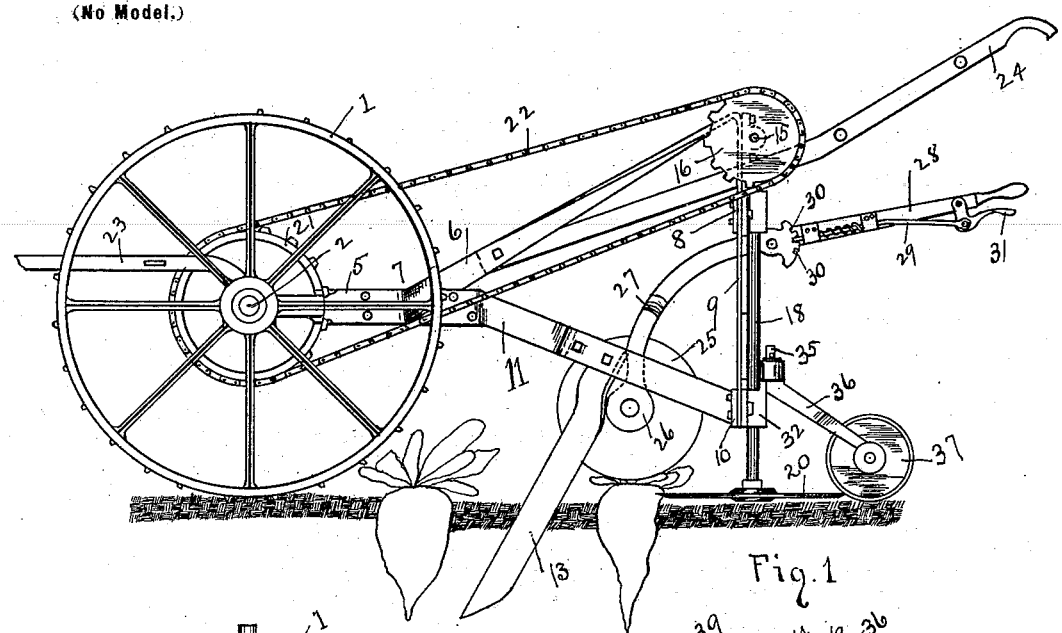
Fig. 1.
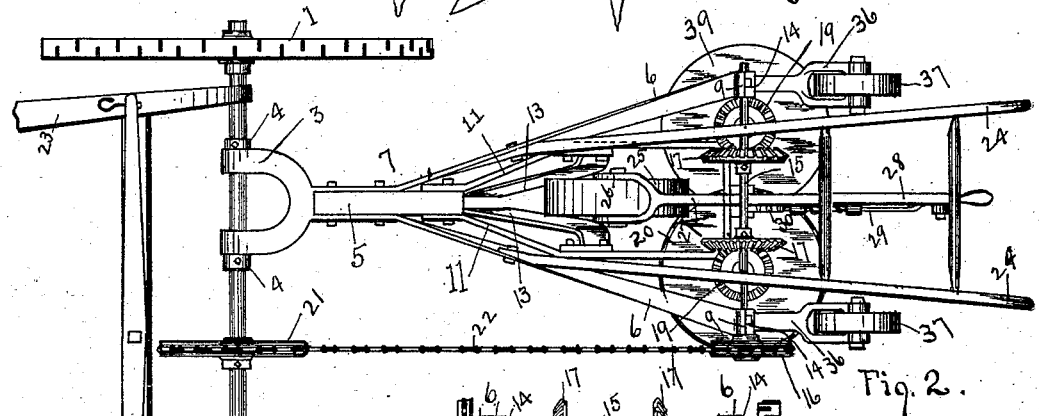
Fig. 2.
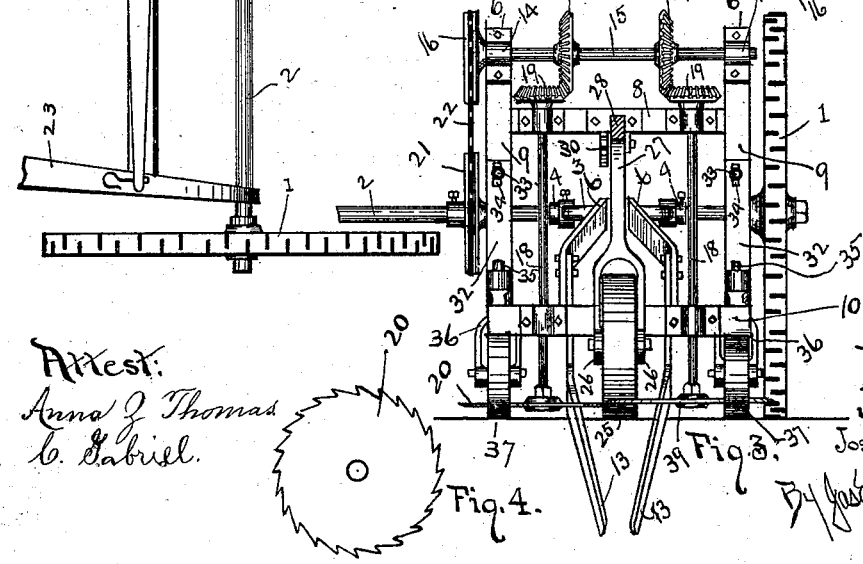
Fig. 3.
Fig. 4.
Attest:
Anna J. Thomas
C. Gabriel.
Inventors:
John Parker
Joseph E. Thompson

UNITED STATES PATENT OFFICE.

JOHN PARKER, OF VASSAR, AND JOSEPH E. THOMPSON, OF REESE, MICHIGAN.

DEVICE FOR LOOSENING AND TOPPING BEETS.

SPECIFICATION forming part of Letters Patent No. 637,656, dated November 21, 1899.

Application filed March 17, 1899. Serial No. 709,538. (No model.)

*To all whom it may concern:*

Be it known that we, JOHN PARKER, residing at Vassar, and JOSEPH E. THOMPSON, residing at Reese, in the county of Tuscola and State of Michigan, citizens of the United States, have invented certain new and useful Improvements in Devices for Loosening and Topping Beets, of which the following is a specification.

Our invention relates to improvements in devices for lifting and topping beets; and the object of the invention is to provide a machine which will lift the beets slightly and loosen the same from the soil and then remove the tops and leaves therefrom in an easy and expeditious manner by means of a horse or team drawing the machine along over the row of beets.

Another object of the invention is to devise a cheap and easily-operated machine for lifting or loosening beets in the ground, so that they may be easily removed or picked out, and also for removing the tops from the beets, so that as they are picked out of the ground they are ready for washing and working into sugar.

The invention consists in the combination and peculiar arrangement of the several devices and contrivances used, and also in the construction and operation of the same, as we will hereinafter describe in detail, and which will also be specifically mentioned and pointed out in the claims.

In the drawings the same reference characters are used in the several views to designate the same part or element.

Figure 1 is a side view in elevation of our improved machine. Fig. 2 is a plan view of the same. Fig. 3 is a rear view of the same, partly sectional. Fig. 4 is a detail showing a section of one of the sections of topping-cutters detached.

1 represents two wheels, which are mounted upon the ends of a shaft 2, one of the wheels being mounted to revolve around the shaft, while the other is fixed firmly thereon, so that the shaft revolves with the wheel.

3 is a yoke having bearings which pass over the shaft 2 and is held in any desired position along the shaft by collars 4, secured to the shaft on each side of the yoke.

Upon the rear portion of the yoke is provided a rearwardly-extending arm 5, and to this arm are secured the front ends of the rearwardly and upwardly extending side pieces 6 of a frame 7, the rear ends of the side pieces being supported in position by a cross-piece 8 and are provided on their rear ends with the downwardly-extending portions 9, to the lower ends of which a cross-piece 10 is secured. To the rear arm 5 of the yoke are also secured the rearwardly and downwardly extending lower side pieces 11 of the frame, and the rear ends of these pieces are secured to the cross-piece 10. Opposite each other and upon the middle portion of the side pieces 11 are secured by their upper ends the colters or lifters 13, set so as to have their lower ends extend forwardly to a desired angle and so that the lower portions of the colter-blades will stand with their front or cutting edges extended to a slight degree farther apart than their rear edges.

Upon the upper sides of the rear part of the side pieces 6 are mounted the boxes 14, in which is journaled the transverse shaft 15, which carries on one end a chain sprocket-wheel 16 and on its middle portion the bevel gear-wheels 17.

At a short distance from each other and below the shaft 15 are the vertical shafts 18, journaled in suitable boxes mounted on the cross-frame pieces 8 and 10, and upon the upper ends of these shafts 18 are firmly mounted the beveled pinions 19, arranged so that their teeth intermesh with the teeth on the gear-wheels 17, and upon the opposite or lower ends of the shafts are firmly secured the circular disks 39 and 20, which are arranged to have their adjacent portions overlap each other and with their peripheries sharpened into cutting edges, the upper disk being beveled from the upper side, while the lower disk is beveled from its lower side, so as to form a circular shears of the disks. If desired, the peripheries of the disks may be provided with teeth, substantially as illustrated in Fig. 4, in order to provide a draw cut to the edges of the cutters.

Upon the shaft 2 a sprocket-wheel 21 is mounted, and upon this sprocket-wheel and over the sprocket-wheel 16 is arranged an endless chain 22 for imparting rotary motion to the shaft 15 from the shaft 2.

Suitable thills 23 are secured to the shaft 2 for the attachment of a horse thereto for drawing the machine, and 24 are handles secured to the framework in any convenient manner and extending to the rear of the machine for the use of the operator for guiding the machine.

Just forward of the cutters and in rear of the lifting-colters is placed a roller 25, journaled upon the side pieces 26 of a frame 27, which is pivotally secured by its rear end to the upper part of the frame and is provided with a rearwardly-extending operating-lever 28, and a lever-pawl 29 is arranged beside this lever for engaging with notches 30, which are provided in an extended portion of the frame-support, and an angle-lever 31 is arranged upon the outer end of the lever 28 and pivoted to the outer end of the lever-pawl for operating the same to raise and lower the roller, as may be required. The roller may be provided with a corrugated periphery or arranged with a plane surface or teeth, as may be found necessary to adapt it for the work.

Upon the rear portion of the vertical portions 9 of the frame are secured the rearwardly-extending supports 32, secured and rendered vertically adjustable by bolts 33, passed through slots 34 in the supports, and upon the outer lower portions of these arms are arranged vertical openings, through which pass loosely the upright portions 35 of the rearwardly-extending arms 36, which have on their outer ends laterally-extending journals, upon which are mounted the supporting-wheels 37, which carry the rear part of the frame and its attachments, and the arms being pivotally attached to the supports provides a caster movement, which allows the machine to be turned easily, while the bolts and slots allow a vertical adjustment of the same as may be desired.

In order to operate the machine, the yoke 3 is placed in a position to allow the horse to walk on one side of the row of growing beets and so that as the machine is drawn along the colters 13 will pass into the ground on opposite sides of the beets, and as the machine is drawn forward the colters lift the beet slightly and loosen it from its bed in the ground. Then the roller 25 passes over the lifted beet and pushes it back slightly to a proper position that allows the revolving cutters to slice off the upper portion of the beet, together with the tops or leaves thereof, and then the beets being thus loosened and freed from their tops are easily picked from the ground and thrown into baskets or crates for delivering to the sugar-factory or for storage.

It will be seen that by this construction a cheap and simple machine is provided which is operated without great practice and by means of which a large amount of work can be accomplished by one man for guiding the machine and driving the horse, and which also allows the beet-crop to be gathered in a short space of time, with the beets free from soil and in the best shape for working up or storage.

Of course it is understood that it may be necessary under some conditions to change the construction somewhat in relation to its minor details and the form of the framework, &c., as these do not affect the general operation of the machine.

What we claim as our invention, and desire to secure by Letters Patent, is—

1. In a beet lifting and topping machine, the combination of the frame mounted on wheels, the lifting-colters carried by said frame and with their lower ends extending forwardly and inwardly, the horizontal rotary disks mounted on vertical shafts in rear of the said colters and having their peripheries provided with cutting edges and with their adjacent edges overlapping each other, and mechanism for imparting a rotary motion to the disks, substantially as set forth.

2. In a beet lifting and topping machine the combination of the frame mounted on wheels, the lifting-colters secured by their upper ends to said frame and having their lower portions standing forwardly and toward each other, a roller adjustably mounted in rear of said lifting-colters for depressing the tops of the lifted beets, the vertical shafts journaled upon the rear portion of said frame and carrying on their lower ends the topping-disks having their adjacent edges overlapping each other and with their peripheries provided with cutting edges adapted for making a shearing cut against each other, and means for imparting a rotary motion to said disks, substantially as set forth.

3. In a beet lifting and topping machine the combination of the frame mounted on wheels, the lifting-colters mounted on said frame and adapted for extending into the ground and for lifting the beets, the rotary cutters carried by said frame in rear of said lifting-colters and provided with means for imparting revolution to said cutters, and a gage-roller adjustably mounted on said frame between the said lifting-colters and rotary cutters, for the purpose set forth substantially as described.

In testimony whereof we have hereunto affixed our signatures.

JOHN PARKER.
JOSEPH E. THOMPSON.

Witnesses:
GEO. P. THOMAS,
JAS. E. THOMAS.